United States Patent
Mate et al.

(10) Patent No.: US 11,632,538 B2
(45) Date of Patent: Apr. 18, 2023

(54) OBJECT DISPLAY IN VIRTUAL AND AUGMENTED REALITY

(71) Applicant: Nokia Technologies Oy, Espoo (FI)

(72) Inventors: Sujeet Shyamsundar Mate, Tampere (FI); Miikka Vilermo, Siuro (FI); Arto Lehtiniemi, Lempäälä (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/358,794

(22) Filed: Jun. 25, 2021

(65) Prior Publication Data

US 2022/0014726 A1 Jan. 13, 2022

(30) Foreign Application Priority Data

Jul. 8, 2020 (EP) ..................................... 20184678

(51) Int. Cl.
*H04N 13/279* (2018.01)
*H04N 13/282* (2018.01)
*H04N 13/178* (2018.01)
*G06F 3/01* (2006.01)

(52) U.S. Cl.
CPC ........... *H04N 13/279* (2018.05); *G06F 3/011* (2013.01); *H04N 13/178* (2018.05); *H04N 13/282* (2018.05)

(58) Field of Classification Search
None
See application file for complete search history.

(56) References Cited

U.S. PATENT DOCUMENTS

| | | | |
|---|---|---|---|
| 9,978,180 B2 | 5/2018 | Margolis et al. | |
| 10,139,623 B2 | 11/2018 | Keane et al. | |
| 10,175,483 B2 | 1/2019 | Salter et al. | |
| 2011/0012900 A1* | 1/2011 | Rotem | G06T 7/593 345/419 |
| 2013/0307856 A1* | 11/2013 | Keane | G06F 3/011 345/473 |
| 2014/0368535 A1* | 12/2014 | Salter | G06F 3/012 345/619 |

(Continued)

FOREIGN PATENT DOCUMENTS

EP 3422708 A1 1/2019

OTHER PUBLICATIONS

Extended European Search Report received for corresponding European U.S. Appl. No. 20184678.9, dated Jan. 13, 2021, 5 pages.

*Primary Examiner* — Anh-Tuan V Nguyen
(74) *Attorney, Agent, or Firm* — Alston & Bird LLP

(57) ABSTRACT

An apparatus comprising means for:
causing display of at least one world-locked volumetric object having at least one non-viewable region;
determining a change in a user's viewing position relative to the at least one world-locked volumetric object;
determining if the change in the user's viewing position relative to the at least one world-locked volumetric object will cause display of at least a portion of the at least one non-viewable region of the at least one world-locked volumetric object; and
if it is determined that the change in the user's viewing position will cause display of at least a portion of the at least one non-viewable region, cause the at least one world-locked volumetric object to be user-locked.

19 Claims, 6 Drawing Sheets

(56) References Cited

U.S. PATENT DOCUMENTS

Figure 1:
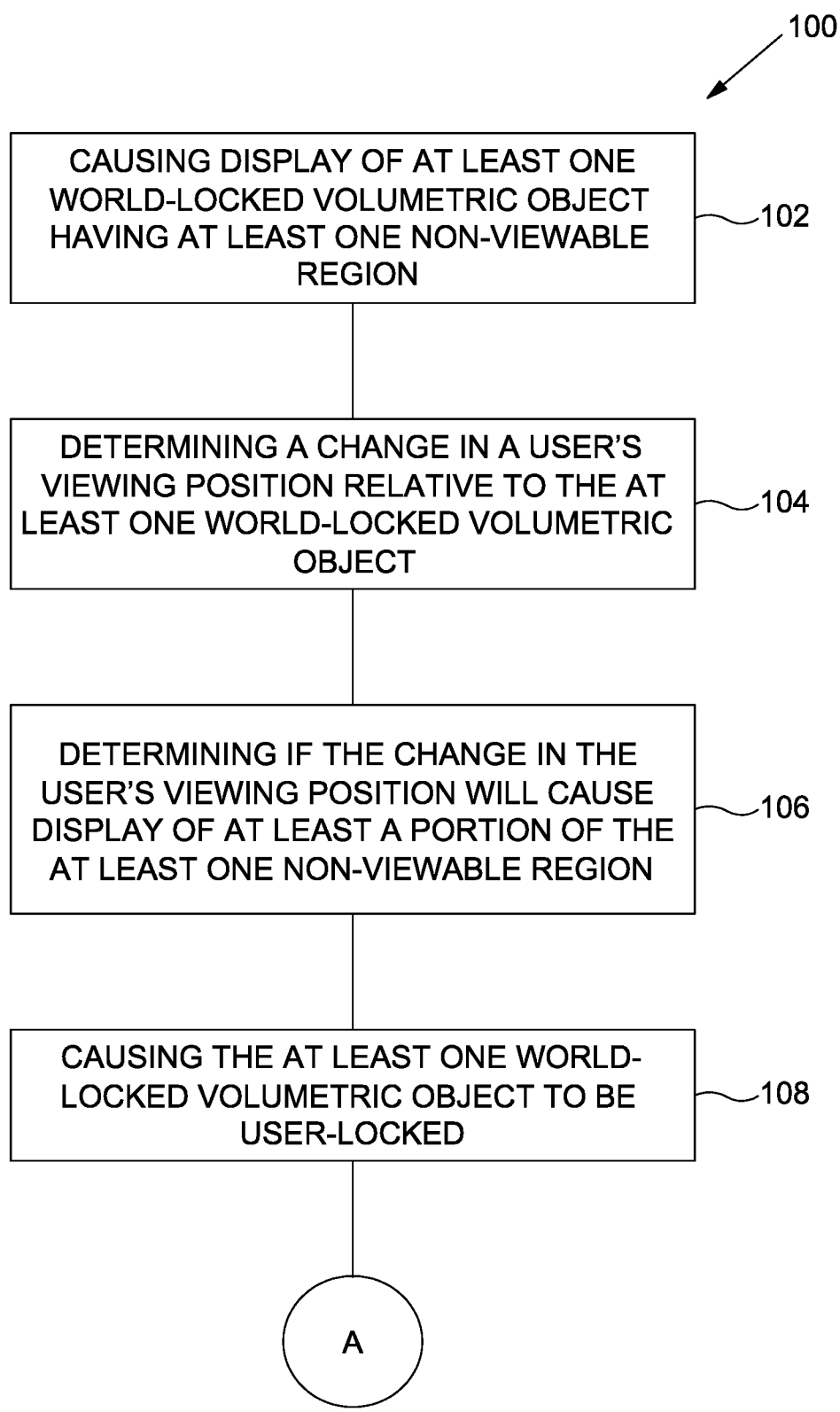

| | | | |
|---|---|---|---|
| 2014/0368537 A1* | 12/2014 | Salter | G06F 3/011 |
| | | | 345/633 |
| 2015/0302663 A1 | 10/2015 | Miller | |
| 2015/0317831 A1* | 11/2015 | Ebstyne | G02B 27/0172 |
| | | | 345/419 |
| 2018/0034867 A1* | 2/2018 | Zahn | G06F 3/04842 |
| 2018/0197324 A1* | 7/2018 | Hanamoto | G06T 15/205 |
| 2018/0321894 A1* | 11/2018 | Paulovich | G02B 27/0172 |
| 2019/0107991 A1 | 4/2019 | Spivack et al. | |
| 2019/0394607 A1 | 12/2019 | Laaksonen et al. | |
| 2020/0226357 A1* | 7/2020 | Protter | G06T 19/00 |
| 2021/0152808 A1* | 5/2021 | He | H04N 21/84 |
| 2021/0170691 A1* | 6/2021 | Lebron | B33Y 30/00 |

* cited by examiner

OBJECT DISPLAY IN VIRTUAL AND AUGMENTED REALITY

TECHNOLOGICAL FIELD

Embodiments of the present disclosure relate to object display. Some relate to object display in virtual reality or augmented reality.

BACKGROUND

Volumetric visual content is becoming more common. For example, use of volumetric visual content in augmented, mixed or extended reality applications.

In some circumstances it may be desirable to improve display of volumetric visual content.

BRIEF SUMMARY

According to various, but not necessarily all, embodiments there is provided examples as claimed in the appended claims.

According to various, but not necessarily all, embodiments there is provided an apparatus comprising means for:
causing display of at least one world-locked volumetric object having at least one non-viewable region;
determining a change in a user's viewing position relative to the at least one world-locked volumetric object;
determining if the change in the user's viewing position relative to the at least one world-locked volumetric object will cause display of at least a portion of the at least one non-viewable region of the at least one world-locked volumetric object; and
if it is determined that the change in the user's viewing position will cause display of at least a portion of the at least one non-viewable region, cause the at least one world-locked volumetric object to be user-locked.

In some examples, the non-viewable region comprises a static and/or animated non-viewable region.

In some examples, the non-viewable region is a static and/or animated non-viewable region.

In some examples, the at least one world-locked volumetric object comprises missing static and/or animated display data and/or static and/or animated display data at sufficient quality.

In some examples, the missing static and/or animated display data has not been captured or has not been synthesized; or the missing static and/or animated display data has not been received or has not been retrieved.

In some examples, the at least one user-locked volumetric object has at least one animated non-viewable region and the means are configured to:
determine that an animation of the at least one user-locked volumetric object has finished; and
the means are configured to, in response to determining that the animation of the at least one user-locked volumetric object has finished, cause the at least one user-locked volumetric object to be world-locked.

In some examples, determining a change in a user's viewing position relative to the at least one world-locked volumetric object comprises estimating a future viewing position of the user relative to the at least one world-locked volumetric object.

In some examples, the means are configured to:
determine a change in a user's viewing position relative to the at least one world-locked volumetric object, from a viewing position of an animated non-viewable region of the at least one world-locked volumetric object to a viewing position of a viewable animated region of the at least one world-locked volumetric object; and
the means are configured to, in response to determining the change in the user's viewing position to a viewing position of a viewable animated region of the at least one world-locked volumetric object, cause display of an animation of the at least one world-locked volumetric object.

In some examples, determining a change in the user's viewing position relative to the at least one world-locked volumetric object, from a viewing position of an animated non-viewable region of the at least one world-locked volumetric object to a viewing position of a viewable animated region of the at least one world-locked volumetric object, comprises estimating a future viewing position of the user relative to the at least one world-locked volumetric object.

In some examples, determining if the change in the user's viewing position relative to the at least one world-locked volumetric object will cause display of at least a portion of the at least non-viewable region of the at least one world-locked volumetric object comprises at least one of: accessing metadata of the at least one world-locked volumetric object, analysing the at least one world-locked volumetric object and accessing capture or synthesize information of the at least one world-locked volumetric object.

In some examples the means comprises
at least one processor; and
at least one memory including computer program code, the at least one memory and computer program code configured to, with the at least one processor, cause the performance of the apparatus. For example, the performance of a method as described herein.

According to various, but not necessarily all, embodiments there is provided an electronic device comprising an apparatus as according to any preceding paragraph and/or as described herein, and a display.

According to various, but not necessarily all, embodiments there is provided a method comprising:
causing display of at least one world-locked volumetric object having at least one non-viewable region;
determining a change in a user's viewing position relative to the at least one world-locked volumetric object;
determining if the change in the user's viewing position relative to the at least one world-locked volumetric object will cause display of at least a portion of the at least one non-viewable region of the at least one world-locked volumetric object; and
if it is determined that the change in the user's viewing position will cause display of at least a portion of the at least one non-viewable region, causing the at least one world-locked volumetric object to be user-locked.

In some examples, the non-viewable region comprises a static and/or animated non-viewable region.

In some examples, the non-viewable region is a static and/or animated non-viewable region.

In some examples, the at least one world-locked volumetric object comprises missing static and/or animated display data and/or static and/or animated display data at sufficient quality.

In some examples, the missing static and/or animated display data has not been captured or has not been synthesized; or the missing static and/or animated display data has not been received or has not been retrieved.

In some examples, the at least one user-locked volumetric object has at least one animated non-viewable region and the method comprises:

determining that an animation of the at least one user-locked volumetric object has finished; and in response to determining that the animation of the at least one user-locked volumetric object has finished, causing the at least one user-locked volumetric object to be world-locked.

In some examples, determining a change in a user's viewing position relative to the at least one world-locked volumetric object comprises estimating a future viewing position of the user relative to the at least one world-locked volumetric object.

In some examples, the method comprises:
determining a change in a user's viewing position relative to the at least one world-locked volumetric object, from a viewing position of an animated non-viewable region of the at least one world-locked volumetric object to a viewing position of a viewable animated region of the at least one world-locked volumetric object; and
in response to determining the change in the user's viewing position to a viewing position of a viewable animated region of the at least one world-locked volumetric object, causing display of an animation of the at least one world-locked volumetric object.

In some examples, determining a change in the user's viewing position relative to the at least one world-locked volumetric object, from a viewing position of an animated non-viewable region of the at least one world-locked volumetric object to a viewing position of a viewable animated region of the at least one world-locked volumetric object, comprises estimating a future viewing position of the user relative to the at least one world-locked volumetric object.

In some examples, determining if the change in the user's viewing position relative to the at least one world-locked volumetric object will cause display of at least a portion of the at least non-viewable region of the at least one world-locked volumetric object comprises at least one of: accessing metadata of the at least one world-locked volumetric object, analysing the at least one world-locked volumetric object and accessing capture or synthesize information of the at least one world-locked volumetric object.

According to various, but not necessarily all, embodiments there is provided a computer program comprising instructions for causing an apparatus to perform at least the following: causing display of at least one world-locked volumetric object having at least one non-viewable region;
determining a change in a user's viewing position relative to the at least one world-locked volumetric object;
determining if the change in the user's viewing position relative to the at least one world-locked volumetric object will cause display of at least a portion of the at least one non-viewable region of the at least one world-locked volumetric object; and
if it is determined that the change in the user's viewing position will cause display of at least a portion of the at least one non-viewable region, cause the at least one world-locked volumetric object to be user-locked.

According to various, but not necessarily all, embodiments there is provided a computer program comprising instructions for causing an apparatus to perform a method as described herein.

According to various, but not necessarily all, embodiments there is provided a computer readable medium comprising a computer program as described herein.

BRIEF DESCRIPTION

Figure 2:
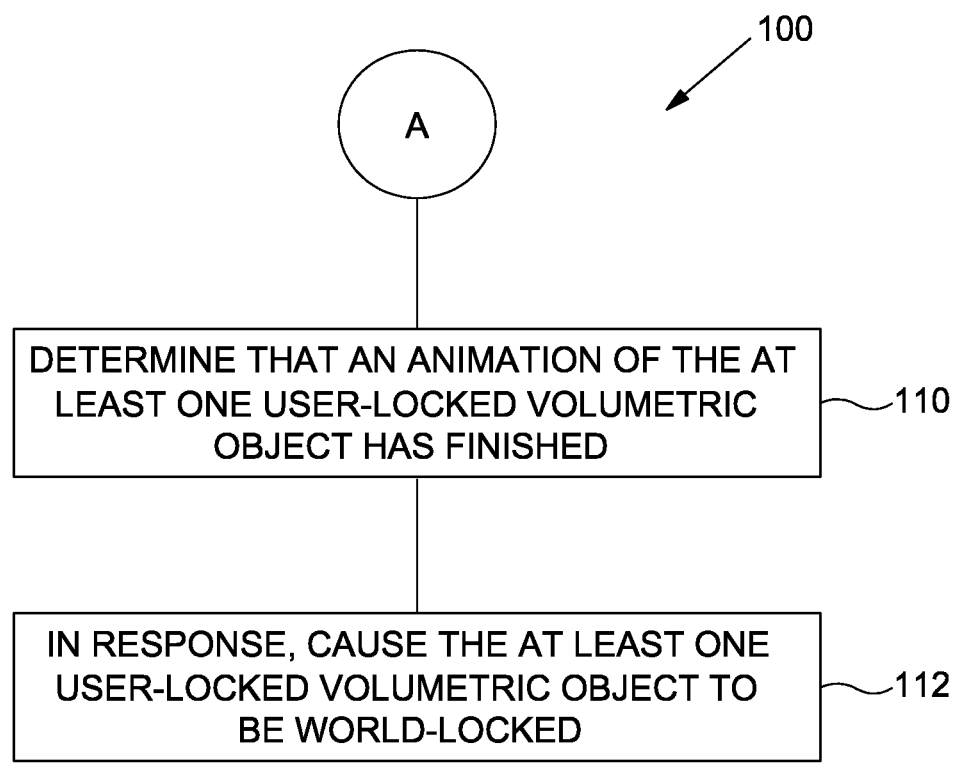
Figure 3:
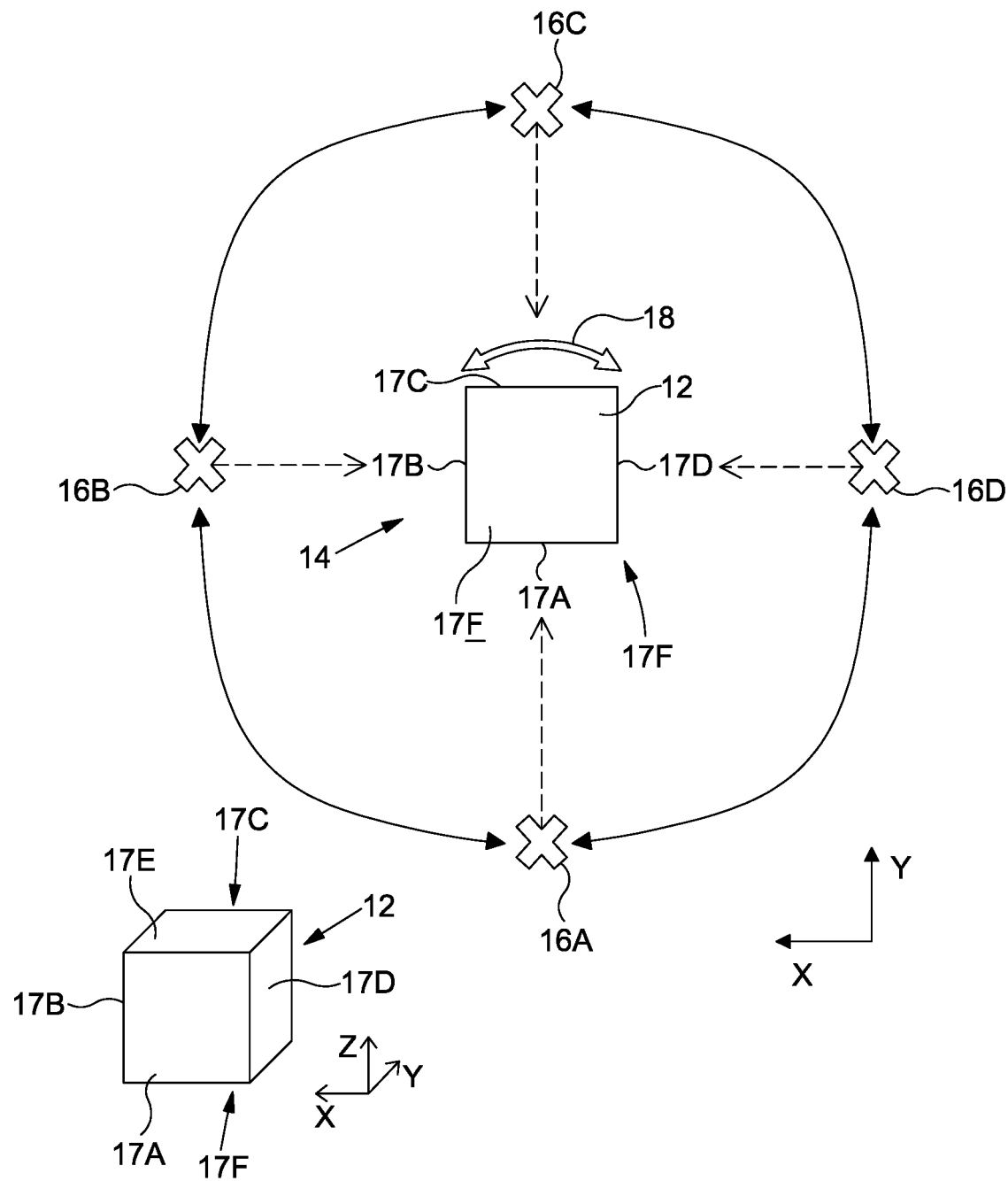
Figure 4A:
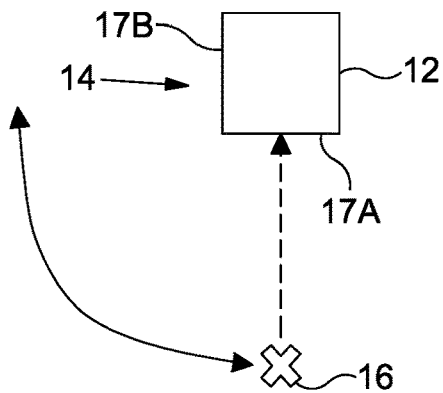
Figure 4B:
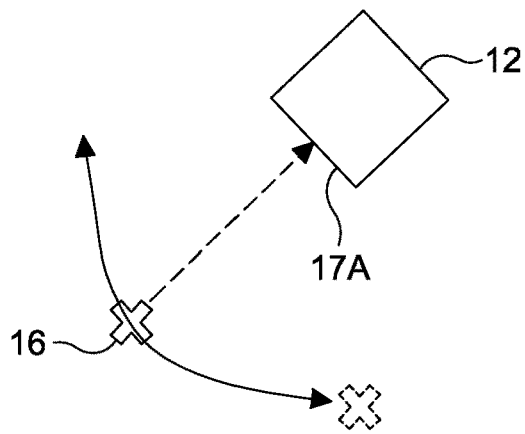
Figure 4C:
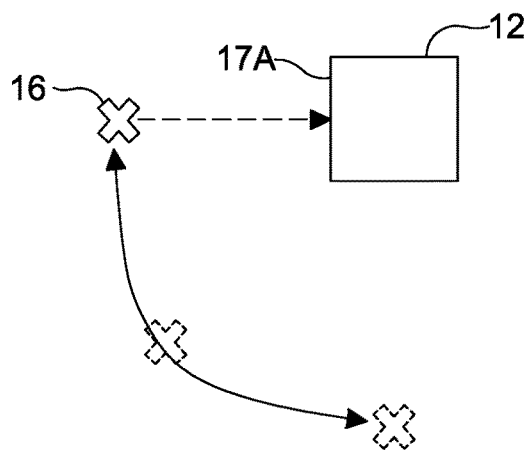
Figure 5A:
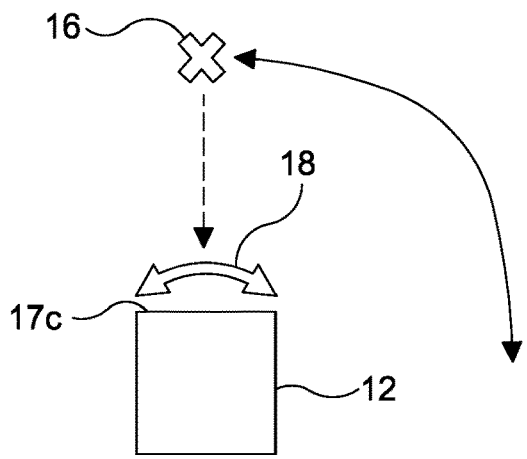
Figure 5B:
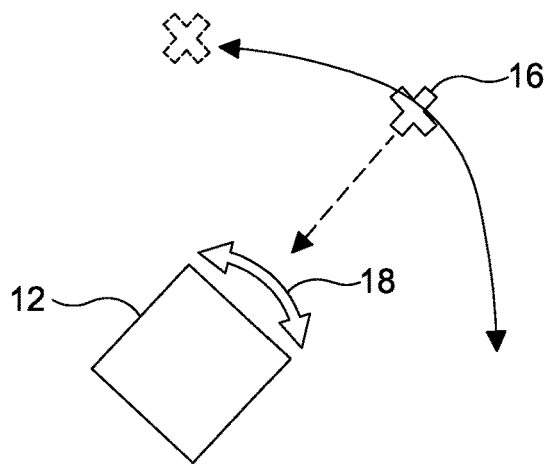
Figure 5C:
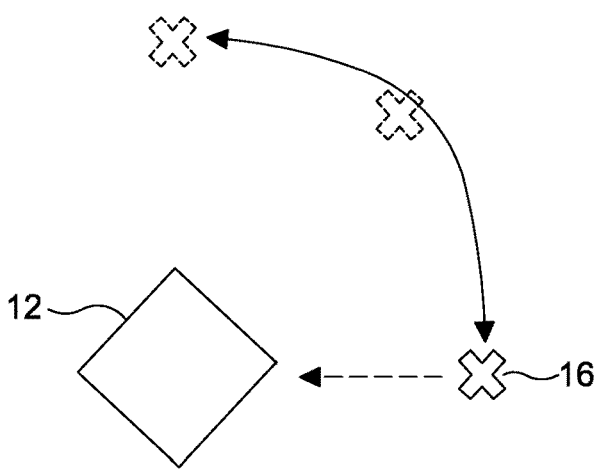
Figure 6A:
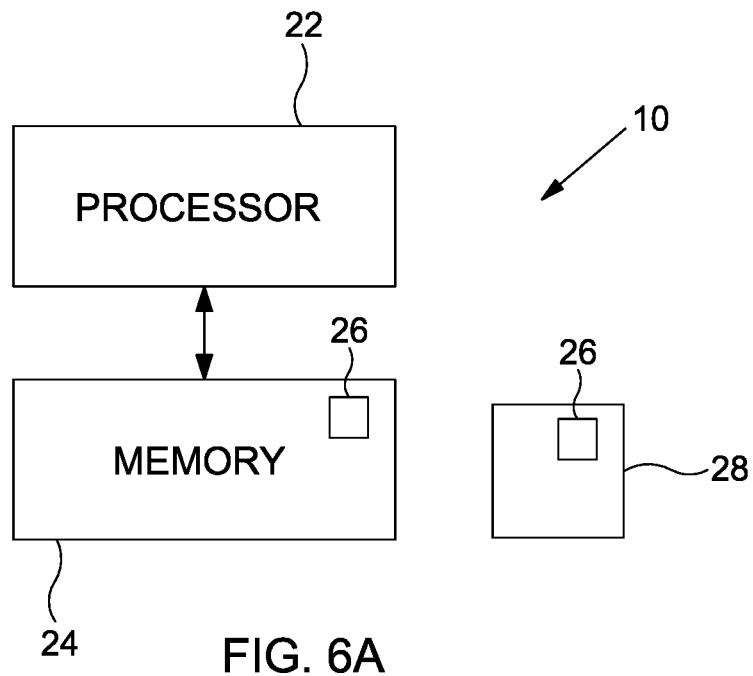
Figure 6B:
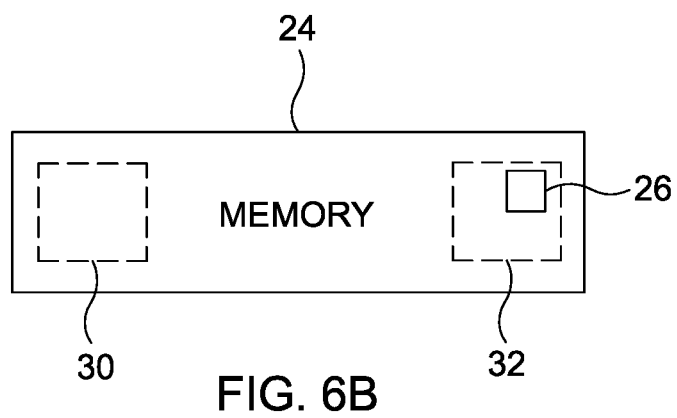

Some examples will now be described with reference to the accompanying drawings in which:

FIG. 1 shows an example of the subject-matter described herein;
FIG. 2 shows another example of the subject-matter described herein;
FIG. 3 shows another example of the subject-matter described herein;
FIG. 4A shows another example of the subject-matter described herein;
FIG. 4B shows another example of the subject-matter described herein;
FIG. 4C shows another example of the subject-matter described herein;
FIG. 5A shows another example of the subject-matter described herein;
FIG. 5B shows another example of the subject-matter described herein;
FIG. 5C shows another example of the subject-matter described herein;
FIG. 6A shows another example of the subject-matter described herein; and
FIG. 6B shows another example of the subject-matter described herein.

DETAILED DESCRIPTION

FIG. 1 illustrates an example of a method 100.

In examples, the method 100 can be performed by any suitable apparatus 10. For example, any suitable apparatus 10 comprising means for performing the method 100 and/or means configured to perform the method 100.

In examples, the method 100 can be performed by an apparatus 10 as described in relation to, at least, FIG. 6A and/or FIG. 6B.

In some examples, the method 100 can be performed by an apparatus 10 as described in relation to, at least, FIGS. 6A and/or 6B, in any suitable electronic device.

One or more of the features discussed in relation to FIGS. 1 and/or 2 can be found in one or more of the other figures.

At block 102, the method comprises causing display of at least one world-locked volumetric object 12 having at least one non-viewable region 14.

In some examples, the non-viewable region 14 comprises a static and/or animated non-viewable region 14.

In some examples, the non-viewable region 14 can be considered to be a static and/or animated non-viewable region 14.

In examples, causing display of the at least one world-locked volumetric object 12 can be considered controlling display of the at least one world-locked volumetric object and/or rendering the at least one world-locked volumetric object 12.

In general, as used herein, 'causing an action or actions' is intended to also disclose performing the action or actions.

For example, causing display of the at least one world-locked volumetric object 12 is also intended to disclose displaying the at least one world-locked volumetric object 12.

Any suitable method for causing display of at least one world-locked volumetric object 12 having at least one non-viewable region 14, such as a static and/or animated non-viewable region 14 can be used.

For example, an apparatus 10 as described in relation to FIG. 6A and/or as described herein can be used to control at least one display to display at least one world-locked volumetric object 12 having at least one non-viewable region 14.

In examples, a volumetric object 12 can be considered an object having a volume.

In examples, a volumetric object 12 can be considered to be an object having a height, a width, and a length.

In some examples, a volumetric object 12 can be considered a visual representation of an object in three physical dimensions.

In examples, a volumetric object 12 can be considered a three-dimensional object or 3D object.

In examples, the volumetric object 12 can be considered a virtual object and can be computer generated and/or an image of a real-world object, in real space, that is live or recorded.

In examples, the volumetric object 12 can be a computer generated or synthesized object and/or data recorded of a real-world object, that is an object that exists in the real world.

For example, the at least one volumetric object 12 can be a representation of a real-world object that has been captured for display as a virtual volumetric object 12.

In examples, any suitable combination of capturing/recording and synthesizing of at least one volumetric object 12 can be used.

Any suitable type and/or sort and/or form of volumetric object(s) 12 can be used. For example, a volumetric object can be or comprise at least one polyhedron, and/or at least one triangulated polyhedron, and/or at least one tetrahedron, and/or at least one polygon, and/or at least one point cloud, point cloud coded objects (PCC ISO/IEC JTC 1/SC 29/WG 11 MPEG-I Part 5), 3G graphics and so on.

In some, but not necessarily all, examples the at least one volumetric object 12 can comprise one or more textures, and/or lighting, and/or one or more bump maps, and/or one or more solids and/or one or more shells and so on.

In examples, the at least one volumetric object 12 can be considered to be world-locked when the location or position and orientation of the object is determined relative to its surrounding environment or world. For example, a world-locked volumetric object 12 can be fixed at a location or position and orientation relative to its surrounding environment or world.

In some examples, the location or position and/or orientation of a world-locked volumetric object 12 can change or vary relative to its surrounding environment or world. For example, a world-locked volumetric object 12 can be configured to move/can move through its environment or world, independent of a viewing position 16 of a user.

In examples, the at least one world-locked volumetric object 12 can be caused to be displayed and/or displayed in any suitable environment.

For example, the environment can be an augmented reality in which a user experiences a partially artificial environment, or virtual space, as a virtual scene comprising a real scene, for example a real visual scene, of a physical real environment, or real space, supplemented by one or more visual elements, such as one or more volumetric objects 12, rendered, or caused to be displayed, by an apparatus to a user.

In examples, augmented reality can be considered mixed reality or hybrid reality.

In some examples, the at least one world-locked volumetric object 12 can be caused to be displayed in a virtual reality environment. A virtual reality environment can be considered to be an environment in which a user experiences a fully artificial environment, or a virtual visual space, as a virtual scene, comprising one or more visual elements, such as one or more volumetric objects 12, rendered, or caused to be displayed, by an apparatus to a user.

In examples, the at least one world-locked volumetric object 12 can be considered to have at least one static and/or animated non-viewable region 14.

In examples, a static object or portion can be considered an object or portion of an object that has no animation and/or a single temporal frame.

In examples, an animated object or portion can be considered an object or portion of an object that is animated or comprises a visual object sequence comprising two or more temporal frames.

A static non-viewable region can be considered a static region of the world-locked volumetric object 12 that is non-viewable.

In examples, a static non-viewable region can be considered a static region that cannot be displayed and/or rendered.

For example, a static volumetric representation of a person's head can have display data missing for the back region of the head. In such an example, the back of the user's head, or the back of the volumetric object 12, can be considered a static non-viewable region 14.

An animated non-viewable region 14 can be considered an animated region of the world-locked volumetric object 12 that is non-viewable.

In examples, an animated non-viewable region can be considered an animated region that cannot be displayed and/or rendered.

For example, an animated volumetric representation of a person's head can have display data missing for one or more sides and/or aspects.

In examples the animation can be the user shaking their head. In examples, the animation can be recorded or captured from the front, but not from the other sides or aspects of the user's head. In such an example, the sides and back of the user's head, or the sides and back of the volumetric object 12, can be considered an animated non-viewable region 14.

In examples, a static and/or animated non-viewable region 14 can be considered at least one static and/or animated non-viewable area and/or facet and/or part and/or portion and/or face and/or side and/or feature and so on.

In examples, it can be considered that the at least one world-locked volumetric object 12 has at least one region and/or facet and/or part and/or portion and/or face and/or side and/or feature and so on that cannot be displayed or cannot be displayed with sufficient quality, for example resolution.

In examples, the at least one world-locked volumetric object 12 comprises missing static and/or animated display data and/or static and/or animated display data at sufficient quality.

In examples, the missing static and/or animated display data has not been captured or has not been synthesized; or the missing static and/or animated display data has not been received or has not been retrieved.

For example, the at least one world-locked volumetric object 12 can have at least one region, for example at least one side, which has not been captured, in relation to real-world objects or regions, or has not been synthesized, in relation to computer generated objects or regions.

Accordingly, such regions of such a volumetric object 12 can be considered non-viewable and/or non-displayable.

In examples, missing static and/or animated display data may exist but has not yet been received, for example, from at least one remote source, or has not yet been retrieved from, for example, at least one memory.

In examples, the missing data can be one or more missing points, and/or one or more missing vertexes, and/or one or more missing triangles, and/or one or more missing solids, and/or one or more missing shells, and/or one or more missing textures, and/or one or more missing bump maps, and/or one or more missing meshes, and/or missing lighting information, and/or any data or information that is needed to represent some visual aspect of the at least one volumetric object 12. In some examples this information is available but not at sufficient quality (for example lower quality texture).

For example, a user's head may have been captured from the front side, right side and back side, but not from the left side. Accordingly, the user's head, displayed as a volumetric object 12, could not be viewed from the left side meaning that such a volumetric object 12 has a static non-viewable region 14.

Similarly, a user's head may have been completely captured from all sides, but an animated sequence of the user's head captured from the front side but not the other sides.

Accordingly, such a volumetric object 12 has animated non-viewable regions 14 as the generation of the user's head shaking is viewable from the front side but not the left, back or right sides.

In examples, the at least one volumetric object 12 can be considered at least one partial volumetric object 12. For example, a shell object that is not manifold.

At block 104 the method 100 comprises determining a change in a user's viewing position 16 relative to the at least one world-locked volumetric object 12.

In examples, movement can comprise any suitable rotation and/or translation of the user relative to the at least one world-locked volumetric object 12.

Any suitable method for determining a change in a user's viewing position 16 relative to the at least one world-locked volumetric object 12 can be used.

In examples, the change in the user's viewing position 16 relative to the at least one world-locked volumetric object 12 can be due to a change user's viewing position 16 and/or a change in the position of the volumetric object 12.

In examples, a change in the user's viewing position 16 can be caused, at least in part, by one or more user inputs. In examples, any suitable user input can be used.

For example, one or more user inputs made via one or more user input devices can cause a change in a user's viewing position 16. For example, this can occur in virtual reality examples.

Additionally, or alternatively, a change in a user's real-world position can cause a change in a user's viewing position 16. For example, in augmented reality examples.

That is, in examples, a user's movement in a real-world environment can cause movement of the user's viewing position 16 relative to the at least one world-locked volumetric object 12.

For example, a user may walk through a real-world environment, such as a park, having at least one world-locked volumetric object 12 overlaid thereon and the user's movement in the real-world can cause a change of the user's viewing position relative to the at least one world-locked volumetric object 12.

In some examples, determining a change in a user's viewing position 16 relative to the at least one world-locked volumetric object 12 comprises estimating a future viewing position of the user relative to at least one world-locked volumetric object 12.

Any suitable method for estimating a future viewing position of the user relative to the at least one world-locked volumetric object 12 can be used.

For example, a user's trajectory can be tracked and from this an estimation of the user's viewing position/location in the future can be estimated. Any suitable trajectory estimation method or methods can be used.

Motion of the user's viewing position 16 can have any suitable number of degrees of freedom. For example, motion of the user's viewing position 16 can have any suitable rotation and/or translation and can, in examples, be moved with six degrees of freedom.

In examples, determining a change in the user's viewing position 16 relative to the at least one world-locked volumetric object 12 can comprise determining a user input that will change a user's viewing position 16 relative to the at least one world-locked volumetric object 12.

In examples, determining if the change in the user's viewing position 16 relative to the at least one world-locked volumetric object 12 will cause display of at least a portion of the at least one non-viewable region 14 of the at least one world-locked volumetric object 12 can be considered to comprise determining if a user input will cause a change in the user's viewing position 16 relative to the at least one world-locked volumetric object 12 which will cause display of at least a portion of the at least one non-viewable region 14 of the at least one world-locked volumetric object 12.

At block 106, the method comprises determining if the change in the user's viewing position 16 relative to the at least one world-locked volumetric object 12 will cause display of at least a portion of the at least one non-viewable region 14 of the at least one world-locked volumetric object 12.

Any suitable method for determining if the change in the user's viewing position 16 relative to the at least one world-locked volumetric object 12 will cause display of at least a portion of the at least one non-viewable region 14 of the at least one world-locked volumetric object 12 can be used.

In examples, determining if the change in the user's viewing position 16 relative to the at least one world-locked volumetric object 12 will cause display of at least a portion of the at least one non-viewable region 14 of the at least one world-locked volumetric object 12 comprises at least one of: accessing metadata of the at least one world-locked volumetric object 12, analyzing the at least one world-locked volumetric object 12 and accessing capture or synthesized information of the at least one world-locked volumetric object 12.

For example, metadata of the at least one world-locked volumetric object 12 can be accessed to determine that the determined change in the user's viewing position 16 relative to the at least one world-locked volumetric object 12 will cause a non-viewable region 14 of the volumetric object 12 to be brought into view.

Similarly, capture or synthesizing information of the at least one world-locked volumetric object 12 can be accessed to determine that a non-viewable region 14 of the volumetric object 12 will be brought into view by the determined change in the user's viewing position 16 relative to the volumetric object 12.

Additionally, or alternatively, the volumetric object 12 can be analyzed to make the determination.

In examples, a future viewing position of the user relative to the at least one world-locked volumetric object 12 is estimated, the estimated trajectory of the user can be analyzed and it can be determined that the estimated trajectory will cause a non-viewable region 14 of the at least one world-locked volumetric object 12 to be displayed.

If it is determined that the change in the user's viewing position 16 will cause display of at least a portion of the at least one non-viewable region 14, the method proceeds to block 108.

At block 108, the method 100 comprises causing the at least one world-locked volumetric object 12 to be user-locked.

In examples, a user-locked volumetric object 12 can be considered to be in some way or regard locked to a position or viewing position 16 of the user.

In examples, motion of a user-locked volumetric object 12 is linked to and/or relative to and/or dependent on motion of a user's viewing position 16.

In some examples, a user-locked volumetric object 12 is moved relative to movement of a user's viewing position 16 so that the user-locked volumetric object 12 appears fixed in position relative to the user under movement of the user's viewing position 16.

In examples, causing at least one world-locked volumetric object 12 to be user-locked, or to become a user-locked volumetric object 12, can be considered causing movement of the at least one user-locked volumetric object 12 relative to motion of the user's viewing position 16 to prevent display of at least one non-viewable region 14 of the volumetric object 12.

In examples any suitable rotation and/or translation of the at least one user-locked volumetric object 12 can be used.

Consequently, FIG. 1 illustrates a method comprising:

causing display of at least one world-locked volumetric object 12 having at least one non-viewable region 14;

determining a change in a user's viewing position 16 relative to the at least one world-locked volumetric object 12;

determining if the change in the user's viewing position 16 relative to the at least one world-locked volumetric object 12 will cause display of at least a portion of the at least one non-viewable region 14 of the at least one world-locked volumetric object 12; and if it is determined that the change in the user's viewing position 16 will cause display of at least a portion of the at least one non-viewable region 14, causing the at least one world-locked volumetric object 12 to be user-locked.

If it is determined at block 106 that the change in the user's viewing position 16 will not cause display of at least a portion of the at least one non-viewable region 14 the method returns to block 102.

The method 100 is advantageous as, for example, it provides for allowing user viewing motion with, for example, six degrees of freedom in relation to volumetric objects 12 even if they are not fully viewable, that is viewable from a subset of possible user viewing positions 16.

Additionally, or alternatively, the method 100 provides for improved display of volumetric objects 12 that are fully viewable when static but viewable from a subset of viewing positions 16 with regard to one or more animations of the volumetric object 12.

This can, for example, enable the use of animations, such as gestures, that otherwise would be non-usable or potentially could prevent using a captured model as a whole.

Additionally, or alternatively, partially incomplete three-dimensional captures can be used in viewing scenarios providing six degrees of freedom with regard to movement of a user's viewing position 16. This can significantly increase the content that can be made compatible with six degree of freedom viewing.

In examples, one or more of the actions of the method 100 can be reordered and/or omitted. In some examples, the method 100 comprises one or more further actions. This is illustrated in the example of FIG. 1 by the method proceeding to point A. See, for example, FIG. 2.

FIG. 2 illustrates an example of a method 100.

In the example of FIG. 2, the method 100 proceeds from point A in the example of FIG. 1.

In the example of FIG. 2, the at least one user-locked volumetric object 12 has at least one animated non-viewable region 14.

At block 110, the method 100 comprises determining that an animation 18 of the at least one user-locked volumetric object 12 has finished.

Any suitable method for determining that an animation of the at least one user-locked volumetric object 12 has finished can be used. For example, it can be determined that the frames of the animation have been exhausted and/or a time period for causing display of the animation has expired.

At block 112, the method 100 comprises in response to determining that the animation 18 of the at least one user-locked volumetric object 12 has finished, causing the at least one user-locked volumetric object 12 to be world-locked.

This is also advantageous as, for example, it allows a volumetric object 12, having an animation viewable from a subset of viewing position, to be used with six degrees of freedom motion of a user's viewing position 16 relative to the volumetric object 12.

Accordingly, in examples where the at least one user-locked volumetric object 12 has at least one animated non-viewable region 14 the method 100 can comprise:

determining that an animation 18 of the at least one user-locked volumetric object 12 has finished; and in response to determining that the animation 18 of the at least one user-locked volumetric object 12 has finished, cause the at least one user-locked volumetric object 12 to be world-locked.

See, for example, FIGS. 5A to 5C.

In some examples, for example FIG. 1 and/or FIG. 2, the method 100 comprises: determining a change in a user's viewing position 16 relative to the at least one world-locked volumetric object 12, from a viewing position of a non-viewable animated region of the at least one world-locked volumetric object 12 to a viewing position of a viewable animated region of the at least one world-locked volumetric object 12; and in response to determining the change in the user's viewing position 16 to a viewing position of a viewable animated region of the at least one world-locked volumetric object 12, causing display of an animation of the at least one world-locked volumetric object 12.

For example, the method 100 can comprise determining that the user's viewing position 16 has moved to a point where an animation of the volumetric object 12 can be displayed and, in response, causing display of the animation.

Any suitable method for determining a change in the user's viewing position can be used, see, for example, block 104 of FIG. 1 and the associated description.

In examples, determining a change in the user's viewing position 16 relative to the at least one world-locked volumetric object 12, from a viewing position of an animated non-viewable region 14 of the at least one world-locked volumetric object 12 to a viewing position 16 of a viewable animated region of the at least one world-locked volumetric object 12, comprises estimating a future viewing position of the user relative to the at least one world-locked volumetric object 12.

Any suitable method for estimating a future viewing position 16 of the user relative to the at least one world-locked volumetric object 12 can be used, see, for example, block 104 of FIG. 1 and the associated description.

In examples, a user's trajectory may be estimated for a future predetermined amount of time, such as a predetermined number of seconds. In examples, any suitable length of time can be used. For example, a length of time in the range 3 seconds to 15 seconds, and/or in the range 5 seconds to 10 seconds.

In examples, it can be estimated that the user's viewing position 16 will provide a view of a viewable animated region of the object 14 for the determined amount of time in which case the animation 18 can be triggered. However, if it is determined from the estimated trajectory of the user's viewing position 16 that the user's viewing position 16 will cause display of an animated non-viewable region 14, the animation 18 will not be triggered.

FIG. 3 illustrates an example of object display.

In the example of FIG. 3 a top down view of a world-locked volumetric object 12 is shown. This is indicated by the coordinates in the lower right of FIG. 3 showing the x and y coordinates whole looking straight down the z axis.

In the example of FIG. 3, for the purpose of illustration, the world-locked volumetric object 12 is a cube. A perspective view of the volumetric object 12 is shown in the lower left corner of FIG. 3. The corresponding x, y and z axis is also shown.

In the example of FIG. 3, the volumetric object 12 is world-locked at a particular value of x, y and z, and having a fixed orientation.

The world-locked volumetric object 12 has six faces. In the example of FIG. 3 a first face 17A can be considered a front face, a second face 17B can be considered a left face, a third face 17C can be considered a back face, a fourth face 17D can be considered a right face, fifth face 17E can be considered a top face and a sixth face 17F can be considered a bottom face.

The faces are also indicated on the perspective view of the volumetric object 12 in the lower left corner of FIG. 3.

Also illustrated in the example of FIG. 3 are four user viewing positions 16A, towards the front face 17A, 16B, towards the left face 17B, 16C, towards the back face 17C and 16D, towards the right face 17D.

In the example of FIG. 3, the user's viewing position 16 can move with six degrees of freedom, however, for the purpose of illustration, the viewing positions 16A, 16B, 16C, 16D are considered.

In the example of FIG. 3 the volumetric object 12 has a static non-viewable region 14 towards the left face 17B.

In the example of FIG. 3, the data for displaying the left face 17B is missing, and therefore the left face 17B of the volumetric object 12 cannot be displayed or caused to be displayed.

Accordingly, in the example of FIG. 3, if the user's viewing position 16 starts at viewing position 16A and moves towards viewing position 16D the volumetric object 12 can be displayed or caused to be displayed correctly and therefore remains world-locked and does not move relative to the user's viewing position movement.

Similarly, as the user's viewing position 16 moves from viewing position 16D to 16C, as indicated by the arrows, the volumetric object 12 can be correctly displayed and therefore the volumetric object 12 remains world-locked.

However, as the user's viewing position 16, moves from viewing position 16C towards 16B, it is determined that the change in the user's viewing position 16 relative to the world-locked volumetric object 12 will cause display of the static non-viewable region 14, which in this example is the left face or side 17B.

Accordingly, as the user's viewing position 16 moves from viewing position 16C towards viewing position 16B the volumetric object 12 becomes user-locked and rotates with the movement of the user's viewing position 16 so that face 17C remains viewable by the user. See, for example, FIGS. 4A to 4C.

In examples, when the volumetric object 12 has become user-locked, it can be "reset" if the user's viewing position 16 moves such that the volumetric object 12 is no longer in the user's view and the volumetric object 12 can be returned to being world-locked.

In the example of FIG. 3, the volumetric object 12 has an associated animation 18. This is illustrated by the bold double-headed arrow near the back face 17c.

If the example of the volumetric object 12 is a person's head, the animation 18 could be a shaking or other motion of the head.

In the example of FIG. 3, the volumetric object 12 has a plurality of animated non-viewable regions 14 (not indicated in the example of FIG. 3 for purposes of clarity). That is because, in the example of FIG. 3, the animation 18 is viewable from viewing positions towards the back face 17C, for example viewing position 16C.

Accordingly, in the example of FIG. 3, faces 17A, 17B, 17D, 17E and 17F are animated non-viewable regions 14.

In the example of FIG. 3, if the animation 18 is active when the user is at viewing position 16C, the volumetric object 12 will become user-locked if the user moves away from viewing position 16C towards viewing position 16B or viewing position 16D to avoid the animated non-viewable regions 14 from being displayed or caused to be displayed.

However, once the animation 18 has completed, the volumetric object 12 can be returned to being world-locked. See, for example, FIGS. 5A to 5C.

In the example of FIG. 3, if the user is viewing from viewing position 16D and moves to viewing position 16C it can be determined that the animation is available from this viewing position and then animation 18 can be triggered.

FIGS. 4A to 4C show examples of object display.

In the examples of FIGS. 4A to 4C a top down view of a volumetric object 12 is shown, similarly to the example of FIG. 3.

In the examples of FIGS. 4A to 4C the volumetric object 12 is again a cube.

Similarly to the example of FIG. 3 the volumetric object 12, in the examples of FIGS. 4A to 4C, has a static non-viewable region 14 towards the left face 17B.

In the example of FIG. 4A, the user's viewing position 16 is towards the front face 17A and the volumetric object 12 is world-locked.

As shown in the example of FIG. 4B, the user changes the viewing position 16 around towards viewing position 16B in FIG. 3.

It is determined that the user's change in viewing position 16 would cause display of at least a portion of the static non-viewable region 14 and therefore the volumetric object 12 becomes user-locked and rotates with the movement of the user's viewing position 16 so that face 17A remains viewable to the user as the user's viewing position 16 moves to corresponding viewing position 16B of FIG. 3. This is shown in FIGS. 4B and 4C.

The user's previous viewing positions are shown in dashed lines.

FIGS. 5A to 5C show examples of object display.

The examples of FIGS. 5A to 5C are similar to those shown in FIGS. 4A to 4C.

However, in the example of FIG. 5A, the volumetric object 12 has an animation 18 and the user is viewing the volumetric object 12 from corresponding viewing position 16C towards the back face 17C of the volumetric object 12.

In FIG. 5B, the user's viewing position moves towards corresponding viewing position 16D and therefore towards an animated non-viewable region 14. The volumetric object 12 is therefore caused to become user-locked and rotates with the movement of the user's viewing position 16 to keep the animation 18 visible to the user.

However, in the example of FIG. 5B, the animation 18 finishes and therefore the volumetric object 12 is returned to being world-locked.

Accordingly, in the example of FIG. 5C, as the user moves to corresponding viewing position 16D of FIG. 3, the volumetric object 12 no longer rotates with the movement of the user's viewing position 16.

Object display as described herein is advantageous as, for example, it provides for allowing user viewing motion with, for example, six degrees of freedom in relation to incomplete volumetric objects 12.

Additionally, or alternatively, the method 100 provides for improved display of volumetric objects 12 that are fully viewable when static but viewable from a subset of viewing positions 16 with regard to one or more animations of the volumetric object 12.

This can, for example, enable the use of animations, such as gestures, that otherwise would be non-usable or potentially could prevent using a captured model as a whole.

Additionally, or alternatively, partially incomplete three-dimensional captures can be used in viewing scenarios providing six degrees of freedom with regard to movement of a user's viewing position 16. This can significantly increase the content that can be made compatible with six degree of freedom viewing.

FIG. 6A illustrates an example of an apparatus 10. The apparatus 10 may be a controller of an apparatus or electronic device.

In examples, any suitable electronic device can be used, for example electronic glasses or goggles, a headset, a mobile telephone, a tablet device, a laptop, a desktop, a pda and so on.

In examples, the apparatus 10 is configured and/or comprises means for performing a method as described in relation to FIG. 1 and/or FIG. 2 and/or as described herein.

Implementation of an apparatus 10 may be as controller circuitry. The apparatus 10 may be implemented in hardware alone, have certain aspects in software including firmware alone or can be a combination of hardware and software (including firmware).

As illustrated in FIG. 6A the apparatus 10 may be implemented using instructions that enable hardware functionality, for example, by using executable instructions of a computer program 26 in a general-purpose or special-purpose processor 22 that may be stored on a computer readable storage medium (disk, memory etc) to be executed by such a processor 22.

The processor 22 is configured to read from and write to the memory 24. The processor 22 may also comprise an output interface via which data and/or commands are output by the processor 22 and an input interface via which data and/or commands are input to the processor 22.

The memory 24 stores a computer program 26 comprising computer program instructions (computer program code) that controls the operation of the apparatus 10 when loaded into the processor 22. The computer program instructions, of the computer program 26, provide the logic and routines that enables the apparatus 10 to perform the methods illustrated in FIGS. 1 and/or 2 and/or as described herein. The processor 22 by reading the memory 24 is able to load and execute the computer program 26.

In examples the means comprises
at least one processor; and
at least one memory including computer program code,
the at least one memory and computer program code configured to, with the at least one processor, cause the performance of the apparatus.

For example, the performance of a method as described herein.

In examples, the apparatus 10 therefore comprises:
at least one processor 22; and
at least one memory 24 including computer program code
the at least one memory 24 and the computer program code configured to, with the at least one processor 22, cause the apparatus 10 at least to perform:
causing display of at least one world-locked volumetric object having at least one non-viewable region;
determining a change in a user's viewing position relative to the at least one world-locked volumetric object;
determining if the change in the user's viewing position relative to the at least one world-locked volumetric object will cause display of at least a portion of the at least one non-viewable region of the at least one world-locked volumetric object; and
if it is determined that the change in the user's viewing position will cause display of at least a portion of the at least one non-viewable region, causing the at least one world-locked volumetric object to be user-locked.

As illustrated in FIG. 6A, the computer program 26 may arrive at the apparatus 10 via any suitable delivery mechanism 28. The delivery mechanism 28 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 26. The delivery mechanism may be a signal configured to reliably transfer the computer program 26. The apparatus 10 may propagate or transmit the computer program 26 as a computer data signal.

In examples, there is provided computer program instructions for causing an apparatus to perform at least the following or for performing at least the following:
determining a change in a user's viewing position relative to the at least one world-locked volumetric object;
determining if the change in the user's viewing position relative to the at least one world-locked volumetric object will cause display of at least a portion of the at least one non-viewable region of the at least one world-locked volumetric object; and
if it is determined that the change in the user's viewing position will cause display of at least a portion of the at least one non-viewable region, causing the at least one world-locked volumetric object to be user-locked.

The computer program instructions may be comprised in a computer program, a non-transitory computer readable medium, a computer program product, a machine readable medium. In some but not necessarily all examples, the computer program instructions may be distributed over more than one computer program.

Although the memory 24 is illustrated as a single component/circuitry it may be implemented as one or more separate components/circuitry some or all of which may be integrated/removable and/or may provide permanent/semi-permanent/dynamic/cached storage.

In examples the memory 24 comprises a random access memory 30 and a read only memory 32. In examples the computer program 26 can be stored in the read only memory 32. See, for example, FIG. 6B In some examples the memory 24 can be split into random access memory 30 and read only memory 32.

Although the processor 22 is illustrated as a single component/circuitry it may be implemented as one or more separate components/circuitry some or all of which may be integrated/removable. The processor 22 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware.

The term circuitry also covers, for example and if applicable to the particular claim element, a baseband integrated circuit for a mobile device or a similar integrated circuit in a server, a cellular network device, or other computing or network device.

The blocks illustrated in the FIGS. 1 and/or 2 may represent steps in a method and/or sections of code in the computer program 26. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

Thus, the apparatus 10 can comprise means for:

causing display of at least one world-locked volumetric object having at least one non-viewable region;

determining a change in a user's viewing position relative to the at least one world-locked volumetric object;

determining if the change in the user's viewing position relative to the at least one world-locked volumetric object will cause display of at least a portion of the at least one non-viewable region of the at least one world-locked volumetric object; and if it is determined that the change in the user's viewing position will cause display of at least a portion of the at least one non-viewable region, cause the at least one world-locked volumetric object to be user-locked.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and/or related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus comprising:
    at least one processor; and
    at least one memory including computer program code,
    the at least one memory and the computer program code configured to, with the at least one processor, cause the apparatus to perform at least the following:
        cause display of at least one world-locked volumetric object having at least one non-viewable region;
        determine a change in a user's viewing position relative to the at least one world-locked volumetric object;
        determine if the changed user's viewing position relative to the at least one world-locked volumetric object is directed to at least a portion of the at least one non-viewable region of the at least one world-locked volumetric object; and
        in response to determining that the changed user's viewing position is directed to the at least a portion of the at least one non-viewable region, cause the at least one world-locked volumetric object to be user-locked.

2. The apparatus as claimed in claim 1, wherein the non-viewable region comprises at least one of a static or animated non-viewable region.

3. The apparatus as claimed in claim 1, wherein the at least one world-locked volumetric object comprises at least one of missing static display data, missing animated display data, static display data at sufficient quality or animated display data at sufficient quality.

4. An apparatus as claimed in claim 3, wherein at least one of the missing static display data or missing animated display data has not been captured or has not been synthesized; or at least one of the missing static display data or missing animated display data has not been received or has not been retrieved.

5. The apparatus as claimed in claim 1, wherein the at least one user-locked volumetric object has at least one animated non-viewable region and the apparatus is configured to:
    determine that an animation of the at least one user-locked volumetric object has finished; and
    in response to determining that the animation of the at least one user-locked volumetric object has finished, cause the at least one user-locked volumetric object to be world-locked.

6. The apparatus as claimed in claim 1, wherein the determining of the change in the user's viewing position relative to the at least one world-locked volumetric object further comprises: estimate a future viewing position of the user relative to the at least one world-locked volumetric object.

7. The apparatus as claimed in claim 1, wherein the apparatus is further configured to:
    determine the change in the user's viewing position relative to the at least one world-locked volumetric object, from a viewing position of an animated non-viewable region of the at least one world-locked volumetric object to a viewing position of a viewable animated region of the at least one world-locked volumetric object; and
    in response to the determining of the change in the user's viewing position to the viewing position of the viewable animated region of the at least one world-locked volumetric object, cause display of an animation of the at least one world-locked volumetric object.

8. The apparatus as claimed in claim 7, wherein determining a change in the user's viewing position relative to the at least one world-locked volumetric object, from the viewing position of the animated non-viewable region of the at least one world-locked volumetric object to the viewing position of the viewable animated region of the at least one world-locked volumetric object, further comprises: estimate a future viewing position of the user relative to the at least one world-locked volumetric object.

9. The apparatus as claimed in claim 1, wherein the determining if the changed user's viewing position relative to the at least one world-locked volumetric object is directed to at least the portion of the at least one non-viewable region of the at least one world-locked volumetric object further comprises at least one of: accessing metadata of the at least one world-locked volumetric object, analyzing the at least one world-locked volumetric object, accessing captured information of the at least one world-locked volumetric object, or accessing synthesized information of the at least one world-locked volumetric object.

10. A method comprising:
    causing display of at least one world-locked volumetric object having at least one non-viewable region;
    determining a change in a user's viewing position relative to the at least one world-locked volumetric object;
    determining if the changed user's viewing position relative to the at least one world-locked volumetric object is directed to at least a portion of the at least one non-viewable region of the at least one world-locked volumetric object; and in response to determining that the changed user's viewing position is directed to the at least a portion of the at least one non-viewable region, causing the at least one world-locked volumetric object to be user-locked.

11. The method as claimed in claim 10, wherein the non-viewable region comprises at least one of a static or animated non-viewable region.

12. The method as claimed in claim 10, wherein the at least one world-locked volumetric object comprises at least one of missing static display data, missing animated display data, static display data at sufficient quality or animated display data at sufficient quality.

13. The method as claimed in claim 12, wherein at least one of the missing static display data or missing animated display data has not been captured or has not been synthesized;
or at least one of the missing static display data or missing animated display data has not been received or has not been retrieved.

14. The method as claimed in claim 10, wherein the at least one user-locked volumetric object has at least one animated non-viewable region and the method further comprises:
determining that an animation of the at least one user-locked volumetric object has finished; and
in response to determining that the animation of the at least one user-locked volumetric object has finished, cause the at least one user-locked volumetric object to be world-locked.

15. The method as claimed in claim 10, wherein determining a change in a user's viewing position relative to the at least one world-locked volumetric object comprises estimating a future viewing position of the user relative to the at least one world-locked volumetric object.

16. The method as claimed in claim 10, further comprising:
determining a change in a user's viewing position relative to the at least one world-locked volumetric object, from a viewing position of an animated non-viewable region of the at least one world-locked volumetric object to a viewing position of a viewable animated region of the at least one world-locked volumetric object; and
in response to determining the change in the user's viewing position to a viewing position of a viewable animated region of the at least one world-locked volumetric object, cause display of an animation of the at least one world-locked volumetric object.

17. The method as claimed in claim 16, wherein determining the change in the user's viewing position relative to the at least one world-locked volumetric object, from the viewing position of the animated non-viewable region of the at least one world-locked volumetric object to the viewing position of the viewable animated region of the at least one world-locked volumetric object, further comprises estimating a future viewing position of the user relative to the at least one world-locked volumetric object.

18. The method as claimed in claim 10, wherein determining if the changed user's viewing position relative to the at least one world-locked volumetric object is directed to at least a portion of the at least one non-viewable region of the at least one world-locked volumetric object further comprises at least one of: accessing metadata of the at least one world-locked volumetric object, analysing the at least one world-locked volumetric object accessing captured information of the at least one world-locked volumetric object, or accessing synthesized information of the at least one world-locked volumetric object.

19. A non-transitory computer readable medium comprising program instructions stored thereon for performing at least the following:
causing display of at least one world-locked volumetric object having at least one non-viewable region;
determining a change in a user's viewing position relative to the at least one world-locked volumetric object;
determining if the changed user's viewing position relative to the at least one world-locked volumetric object is directed to at least a portion of the at least one non-viewable region of the at least one world-locked volumetric object; and
in response to determining that the changed user's viewing position is directed to the at least a portion of the at least one non-viewable region, causing the at least one world-locked volumetric object to be user-locked.

* * * * *

UNITED STATES PATENT AND TRADEMARK OFFICE
CERTIFICATE OF CORRECTION

| | |
|---|---|
| PATENT NO. | : 11,632,538 B2 |
| APPLICATION NO. | : 17/358794 |
| DATED | : April 18, 2023 |
| INVENTOR(S) | : Sujeet Shyamsundar Mate et al. |

It is certified that error appears in the above-identified patent and that said Letters Patent is hereby corrected as shown below:

In the Claims

In Column 20, Line 22, Claim 18, delete "object accessing" and insert -- object, accessing --, therefor.

Signed and Sealed this
First Day of August, 2023

Katherine Kelly Vidal
*Director of the United States Patent and Trademark Office*